United States Patent
Sielaff

(10) Patent No.: US 12,515,509 B2
(45) Date of Patent: Jan. 6, 2026

(54) ELECTRIFIED VEHICLE INCLUDING BATTERY PACK WITH MODULAR CONFIGURATION

(71) Applicant: Ford Global Technologies, LLC, Dearborn, MI (US)

(72) Inventor: Jason Luke Sielaff, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 309 days.

(21) Appl. No.: 18/208,357

(22) Filed: Jun. 12, 2023

(65) Prior Publication Data
US 2024/0408950 A1    Dec. 12, 2024

(51) Int. Cl.
| | |
|---|---|
| *B60K 1/04* | (2019.01) |
| *B60K 11/02* | (2006.01) |
| *B60L 50/60* | (2019.01) |
| *B60L 50/64* | (2019.01) |
| *B62D 25/24* | (2006.01) |
| *H01M 10/613* | (2014.01) |
| *H01M 10/625* | (2014.01) |
| *H01M 10/6567* | (2014.01) |
| *H01M 50/204* | (2021.01) |
| *H01M 50/249* | (2021.01) |
| *H01M 50/258* | (2021.01) |
| *H01M 50/262* | (2021.01) |
| *H01M 50/271* | (2021.01) |
| *H01M 50/296* | (2021.01) |
| *H01M 50/574* | (2021.01) |

(Continued)

(52) U.S. Cl.
CPC ............. *B60K 1/04* (2013.01); *B60K 11/02* (2013.01); *B60L 50/64* (2019.02); *B60L 50/66* (2019.02); *B62D 25/24* (2013.01); *H01M 10/613* (2015.04); *H01M 10/625* (2015.04); *H01M 10/6567* (2015.04); *H01M 50/204* (2021.01); *H01M 50/249* (2021.01); *H01M 50/258* (2021.01); *H01M 50/262* (2021.01); *H01M 50/271* (2021.01); *H01M 50/296* (2021.01); *H01M 50/574* (2021.01); *H01M 50/588* (2021.01); *H01M 50/591* (2021.01); *B60K 2001/0438* (2013.01); *H01M 2220/20* (2013.01)

(58) Field of Classification Search
CPC ........... B60K 1/04; B60K 11/02; B60L 50/64; B60L 50/66; H01M 10/613; H01M 10/625; H01M 10/6567
USPC ............................................... 180/68.5
See application file for complete search history.

(56) References Cited

U.S. PATENT DOCUMENTS

| | | |
|---|---|---|
| 5,760,569 A | 6/1998 | Chase, Jr. |
| 6,265,091 B1 | 7/2001 | Pierson et al. |

(Continued)

FOREIGN PATENT DOCUMENTS

| | | |
|---|---|---|
| EP | 0836973 A2 | 4/1998 |
| RU | 2636382 C2 | 11/2017 |
| WO | 2010042517 A1 | 4/2010 |

*Primary Examiner* — Hau V Phan
(74) *Attorney, Agent, or Firm* — David B. Kelley; Carlson, Gaskey & Olds, P.C.

(57) ABSTRACT

An electrified vehicle may include an underbody. An electrified vehicle may include a battery pack mounted to the underbody, wherein the battery pack includes a plurality of modules, wherein each module includes an array of battery cells, and wherein each module is individually removable from the battery pack without requiring removal of the battery pack from the underbody.

12 Claims, 3 Drawing Sheets

(51) Int. Cl.
*H01M 50/588* (2021.01)
*H01M 50/591* (2021.01)

(56) References Cited

U.S. PATENT DOCUMENTS

| | | | |
|---|---|---|---|
| 8,146,694 B2 | 4/2012 | Hamidi | |
| 9,266,434 B2 | 2/2016 | Girard et al. | |
| 9,381,822 B2 | 7/2016 | Scheucher | |
| 2010/0052616 A1* | 3/2010 | Takada | H01M 10/4207 320/150 |
| 2017/0077565 A1* | 3/2017 | Burrows | H01M 10/613 |
| 2019/0305389 A1* | 10/2019 | Poirier | B60L 58/12 |
| 2020/0136107 A1* | 4/2020 | Meyers | H01M 50/204 |
| 2021/0291636 A1* | 9/2021 | Bohmer | B62D 65/024 |
| 2022/0219549 A1* | 7/2022 | Slepchenkov | B60L 58/21 |
| 2022/0289067 A1* | 9/2022 | Adegbohun | H01M 10/6554 |
| 2023/0009016 A1* | 1/2023 | Slepchenkov | H02M 3/337 |
| 2023/0040660 A1* | 2/2023 | Slepchenkov | H02M 3/33561 |

* cited by examiner

ELECTRIFIED VEHICLE INCLUDING BATTERY PACK WITH MODULAR CONFIGURATION

TECHNICAL FIELD

This disclosure relates to an electrified vehicle including a battery pack with a modular configuration.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

SUMMARY

In some aspects, the techniques described herein relate to an electrified vehicle, including: an underbody; and a battery pack mounted to the underbody, wherein the battery pack includes a plurality of modules, wherein each module includes an array of battery cells, and wherein each module is individually removable from the battery pack without requiring removal of the battery pack from the underbody.

In some aspects, the techniques described herein relate to an electrified vehicle, further including: an access cover mounted to the underbody and configured to selectively cover and uncover the battery pack; a latch assembly selectively moveable to an engage position in which the access cover is prevented from being opened, and a release position in which the access cover is able to be opened; and a disconnect switch configured to selectively deenergize the battery pack, wherein the latch assembly is only in the release position when the disconnect switch deenergizes the battery pack.

In some aspects, the techniques described herein relate to an electrified vehicle, further including a fluid source, and wherein: the access cover includes a plurality of sets of inlets and outlets configured to direct fluid from the fluid source relative to the modules, and each module includes an inlet and an outlet configured to fluidly couple to one of the sets of inlets and outlets of the access cover.

In some aspects, the techniques described herein relate to an electrified vehicle, wherein, when the disconnect switch deenergizes the battery pack, fluid stops flowing from the fluid source.

In some aspects, the techniques described herein relate to an electrified vehicle, wherein the inlets and outlets of the access cover include male connections, and wherein the inlets and outlets of the modules include female connections.

In some aspects, the techniques described herein relate to an electrified vehicle, wherein the inlets and outlets of the access cover each include a valve configured to close when fluid stops flowing from the fluid source.

In some aspects, the techniques described herein relate to an electrified vehicle, wherein the inlets and outlets of each module are configured to seal closed when the corresponding set of inlets and outlets of the access cover are not interfaced with the inlets and outlets of the module.

In some aspects, the techniques described herein relate to an electrified vehicle, wherein the inlets and outlets of each module include valves configured to close when the access cover is opened.

In some aspects, the techniques described herein relate to an electrified vehicle, wherein: each module includes an electrical terminal, each module is electrically connectable to another module via an electrical connector connected to the electrical terminal, the electrical terminal is selectively covered and uncovered by a cap, and the cap is configured such that when the electrical connector is decoupled from the electrical terminal, the cap covers the electrical terminal.

In some aspects, the techniques described herein relate to an electrified vehicle, wherein: each module includes a housing, and the plurality of battery cells are arranged in the housing.

In some aspects, the techniques described herein relate to an electrified vehicle, wherein each module is attachable to the underbody, either directly or indirectly, via one or more brackets.

In some aspects, the techniques described herein relate to a module for a battery assembly, including: a housing, wherein a plurality of battery cells are arranged within the housing; an electrical terminal configured to electrically connect to an electrical connector; a cap, wherein the cap is configured to cover the electrical terminal when an electrical connector is decoupled from the electrical terminal; an inlet configured to permit fluid to enter the housing; and an outlet configured to permit fluid to exit the housing, wherein the inlets and outlets of the module include seals configured to close when not interfaced with inlets and outlets of an access cover.

In some aspects, the techniques described herein relate to a module, wherein the inlet and outlet are configured to fluidly couple to one of an inlet and outlet of an access cover when the inlet and outlet of the access cover penetrate the seals.

In some aspects, the techniques described herein relate to a method, including: opening an access cover to expose a plurality of modules of a battery pack of an electrified vehicle, wherein the battery pack is mounted to an underbody of the electrified vehicle; and removing one of the modules without removing the battery pack from the electrified vehicle.

In some aspects, the techniques described herein relate to a method, further including: deenergizing the battery pack using a disconnect switch.

In some aspects, the techniques described herein relate to a method, further including: when the battery pack is deenergized, releasing a latch assembly of the access cover such that the access cover can be opened.

In some aspects, the techniques described herein relate to a method, further including: decoupling a fluid connection between the access cover and the modules.

In some aspects, the techniques described herein relate to a method, further including: after the decoupling step, sealing closed inlets and outlets of the module.

In some aspects, the techniques described herein relate to a method, further including: decoupling an electrical connector from an electrical terminal of the module.

In some aspects, the techniques described herein relate to a method, further including: closing a cap such that the electrical terminal is covered after the decoupling step.

DETAILED DESCRIPTION

This disclosure relates to an electrified vehicle including a battery pack with a modular configuration. Among other benefits, which will be appreciated from the below description, this disclosure permits individual modules of the battery pack to be removed, without requiring removal of the entire battery pack, which increases the ease of servicing the battery pack.

Figure 1:
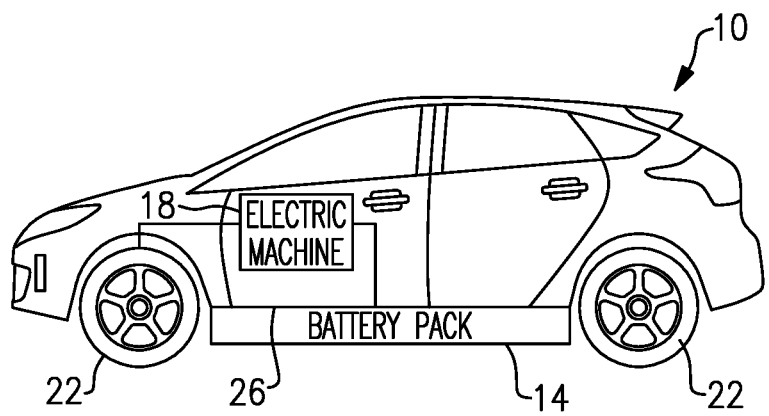
FIG. 1 illustrates a side view of an electrified vehicle.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to a floor, or an underbody, 26 of the electrified vehicle 10. The floor, in this example, refers to a bottom portion of a body of the electrified vehicle 10 and/or a chassis of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

Figure 2:
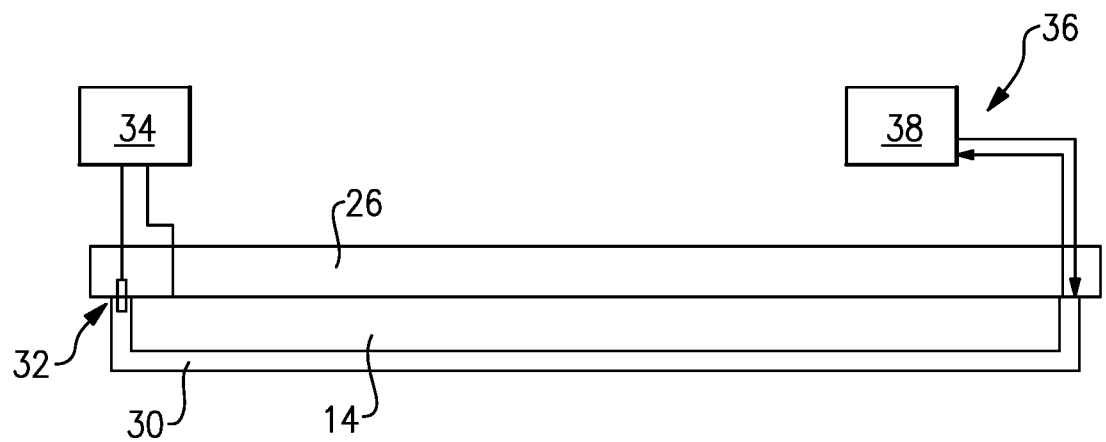
FIG. 2 illustrates, somewhat schematically, additional details of a battery pack, including the manner in which the battery pack is mounted relative to the electrified vehicle.

FIG. 2 is a somewhat schematic representation of exemplary details of the battery pack 14, including the manner in which the battery pack 14 is mounted relative to the underbody 26. In this example, the battery pack 14 is covered by an access cover 30. The access cover 30 is configured to attach to the underbody 26 and, together with the underbody 26, enclose the battery pack 14. In this regard, the access cover 30 provides a combination of an access cover and a strike shield configured to absorb forces from the outside environment.

The access cover 30 is configured to cover and uncover the battery pack 14. In this example, a latch assembly 32 is configured to selectively release and engage the access cover 30. When the latch assembly 32 is released, the access cover 30 is able to uncover the battery pack 14. The latch assembly 32 is arranged between the underbody 26 and the access cover 30, in this example. In another example, a panel, such as a bottom panel, of the access cover 30 may be configured to selectively open, and the latch assembly 32 could be arranged relative to that panel.

In this example, the latch assembly 32 is only released when a disconnect switch 34 deenergizes the battery pack 14 such that power does not flow relative to the battery pack 14. The disconnect switch 34 may be arranged in a location spaced-apart from the battery pack 14. In a particular example, the disconnect switch 34 is accessible from a passenger cabin of the electrified vehicle 10.

In an embodiment of this disclosure, thermal management fluid is directed to the battery pack 14 via the access cover 30. As shown in FIG. 2, the electrified vehicle 10 includes a thermal management system 36, which includes a fluid source 38 configured to direct fluid to and from the access cover 30. The thermal management system 36 may include tubes, hoses, pipes, grooves, channels, conduits, valves, pumps, or the like, to direct fluid to and from the fluid source 38 and the access cover 30. Likewise, the access cover 30 includes tubes, hoses, pipes, grooves, channels, conduits, valves, etc., configured to direct fluid within the access cover 30 and relative to the battery pack 14.

Figure 3:
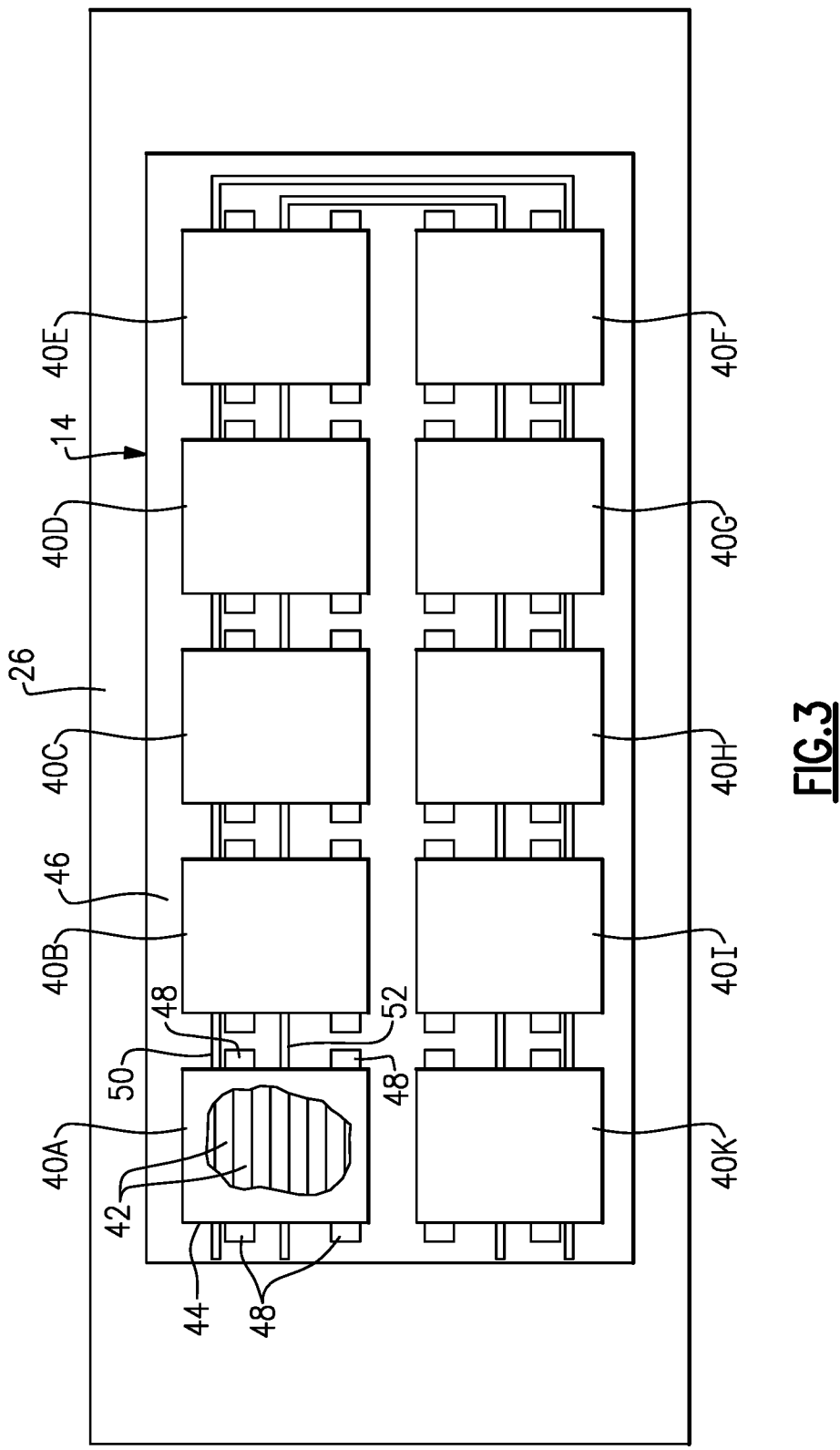
FIG. 3 illustrates the battery pack from a bottom perspective with an access cover removed such that a plurality of modules are visible.

FIG. 3 is a view of the battery pack 14 from a bottom perspective with the access cover 30 removed. As shown in FIG. 3, the battery pack 14 includes a plurality of modules 40A-40K. While a particular number of modules is shown in FIG. 3, this disclosure extends to battery packs with a different quantity of modules.

Each module 40A-40K includes an array of battery cells 42 arranged within a housing 44. With reference to module 40A, each housing 44 is attachable to the underbody 26 either directly, or via a separate structure 46, such as a lid, providing a portion of an enclosure of the battery pack 14, via one or more brackets 48. In this example, the module 40A is attachable to the structure 46 via four brackets 48. Each of the other modules 40B-40K are attachable using brackets in a similar manner.

Each module 40A-40K is also electrically connected to at least one other module. For example, module 40A is electrically connected to module 40B via an electrical connector 50. The electrical connector 50 is a busbar in one example. Each module 40A-40K may also be fluidly coupled to one another using coolant hoses 52. The coolant hoses 52 are optional.

Figure 4:
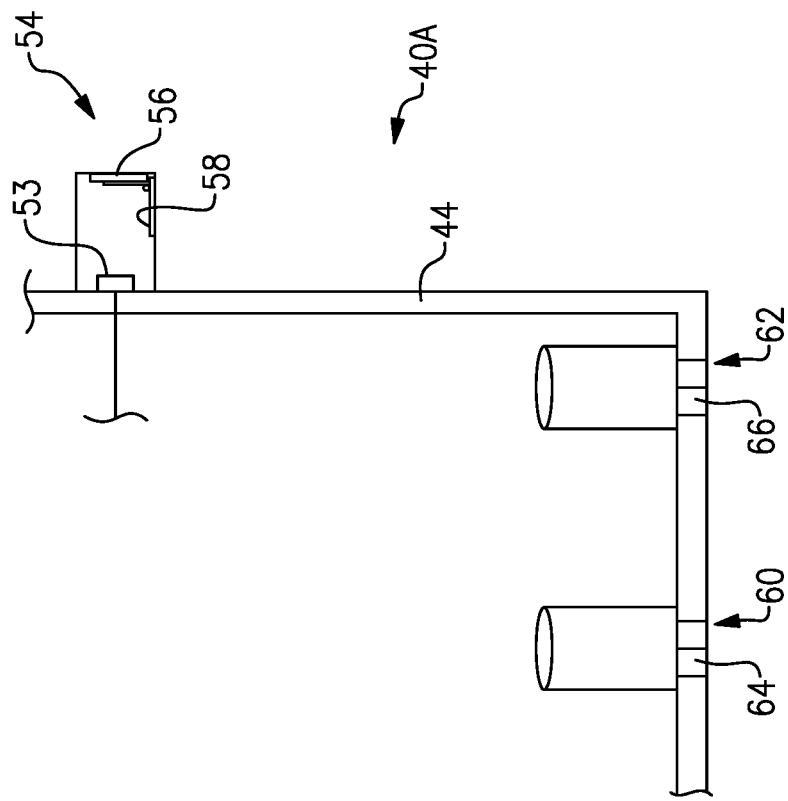
FIG. 4 illustrates a portion of a housing of a module.

An example configuration of the housing 44 of the modules 40A-40K will now be described relative to FIG. 4, which illustrates a portion of the housing 44 of the module 40A. As shown in FIG. 4, the module 40A includes an electrical terminal 53. The electrical terminal 53 is electrically connected to each of the cells 42. The electrical terminal 53 is selectively covered and uncovered by a cap assembly 54, or cap, which in this example is attached to the housing 44. The cap assembly 54 may include a moveable panel 56, which is biased to a closed position by a spring 58, in this example. In the closed position, the moveable panel 56 covers the electrical terminal 53.

Figure 5:
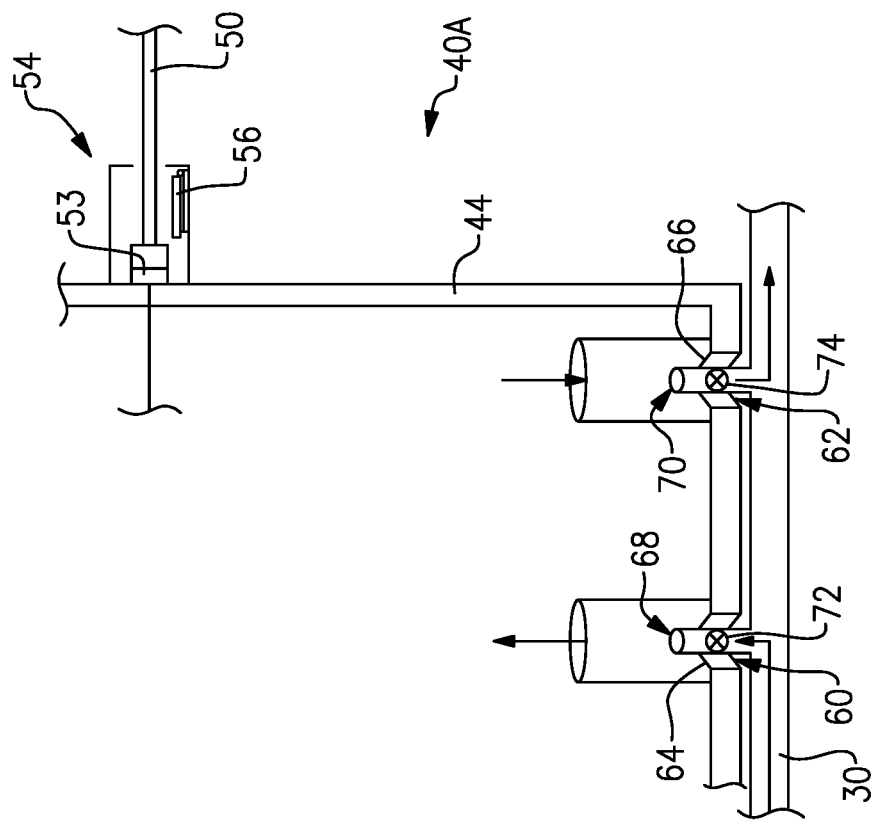
FIG. 5 illustrates the portion of the housing of the module relative to the access cover and an electrical connector.

The electrical terminal 53 is configured to interface with the electrical connector 50 to electrically couple the module 40A to another module, as shown in FIG. 5. In FIG. 5, a user has applied a force to the panel 56 to overcome the biasing force of the spring 58 such that the panel 56 moves to an open position, and the electrical connector 50 can interface with the electrical terminal 53. When the electrical connector 50 is removed from the electrical terminal, the panel 56 will return to the closed position of FIG. 4. While an example cap assembly 54 has been described, this disclosure extends to other arrangements in which the electrical terminal 53 is covered when decoupled from the electrical connector 50.

The housing 44 is also configured to fluidly couple to the access cover 30 such that fluid from the fluid source 38 can flow through the access cover 30 and into the housing 44. An example interface of the housing 44 and the access cover 30 will now be described.

In the example, the housing 44 includes an inlet port 60 and an outlet port 62. The inlet and outlet ports 60, 62 are configured as female connections and are provided in a bottom wall of the housing 44, in this example. The inlet and outlet ports 60, 62 are each configured to seal when the inlet and outlet ports 60, 62 are not coupled to corresponding inlet and outlet ports of the access cover 30. In this example, the inlet and outlet ports 60, 62 each include elastomeric seals 64, 66. This disclosure extends to other types of seals. In FIG. 4, the seals 64, 66 are in a closed position, and are configured so as to prevent fluid within the housing 44 from exiting the housing 44. The seals 64, 66 are biased to the closed position.

The access cover 30 includes an inlet port 68 and an outlet port 70 configured to interface with the inlet and outlet ports 60, 62 of the housing 44. It should be understood that the access cover 30 includes additional sets of inlets and outlets configured to couple to inlets and outlets of other modules. The inlet port 68 and outlet port 70 are configured as male connections and are configured to penetrate the seals 64, 66 to establish a fluid interface between the access cover 30 and the housing 44, as shown in FIG. 5. In an example, both the inlet port 68 and the outlet port 70 include a valve 72, 74 configured to close when fluid is not flowing through the access cover 30. In an example, the valves 72, 74 are check valves configured to close when a minimum cracking pressure is not reached. In an example, when a pump of the thermal management system 36 is deactivated, the cracking pressure is not reached and the valves 72, 74 close. In a further example, a pump of the thermal management system 36 is deactivated when the disconnect switch 34 deenergizes the battery pack 14. The seals 64, 66 and valves 72, 74 significantly reduce, if not eliminate, fluid leaks during service.

Downstream of the inlet and outlet ports 62, 64, fluid is directed within the housing 44 to immerse the cells 42, or alternatively the fluid is directed through a thermal exchange plate within the housing 44, to transfer heat relative to the cells 42.

The fluid may be a non-conductive fluid, such as a dielectric fluid designed for immersion cooling the cells 42. One suitable non-conductive fluid is a Novek™ engineered fluid sold by 3M™. However, other non-conductive fluids may also be suitable, and the actual chemical make-up and design characteristics (e.g., dielectric constant, maximum breakdown strength, boiling point, etc.) may vary depending on the environment the arrays are to be employed within. Unlike the conductive glycol utilized within known cold plate systems, the non-conductive fluid received inside the immersion cooled battery arrays of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

This disclosure permits one to service the battery pack 14 by independently removing one or more of the modules 40A-40K from the electrified vehicle 10, and without requiring removal of the entire battery pack 14. In an example, to service the battery pack 14, a technician operates the disconnect switch 34 to deenergize the battery pack 14. When doing so, fluid stops flowing relative to the battery pack 14 such that the valves (e.g., valves 72, 74) corresponding to the inlet and outlet ports of the access cover 30 close. Operating the disconnect switch 34 also releases the latch assembly 32, which permits the technician to open the access cover 30.

Opening the access cover 30 decouples the inlets and outlets (e.g., 60, 62) of modules 40A-40K with those of the access cover, at which point the seals (e.g., 64, 66) of the modules 40A-40K close to prevent fluid from exiting the modules 40A-40K. The technician can then inspect the modules 40A-40K. If the technician determines that one of the modules 40A-40K requires service, the technician removes any electrical connectors 50 attached to the relevant module, which causes corresponding cap assemblies to close, thereby preventing contact between the technician and an electrical terminal. Then, the technician disconnects the brackets 48, such as by disconnecting any fasteners associated with the brackets 48, and removes the relevant module. The technician can replace the module after completing service, for example. This example procedure can be entirely performed in the field, without requiring a specialized vehicle lift.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
  an underbody; and
  a battery pack mounted to the underbody, wherein the battery pack includes a plurality of modules, wherein each module includes an array of battery cells, and wherein each module is individually removable from the battery pack without requiring removal of the battery pack from the underbody;
  an access cover mounted to the underbody and configured to selectively cover and uncover the battery pack;
  a latch assembly selectively moveable to an engage position and a release position, wherein the access cover is prevented from being opened in the engage position, and wherein the access cover is able to be opened in the release position.

2. The electrified vehicle as recited in claim 1, further comprising:
  a disconnect switch configured to selectively deenergize the battery pack, wherein the latch assembly is only in the release position when the disconnect switch deenergizes the battery pack.

3. The electrified vehicle as recited in claim 1, wherein:
  each module includes a housing, and
  the plurality of battery cells are arranged in the housing.

4. The electrified vehicle as recited in claim 3, wherein each module is attachable to the underbody, either directly or indirectly, via one or more brackets.

5. An electrified vehicle, comprising:
an underbody; and
a battery pack mounted to the underbody, wherein the battery pack includes a plurality of modules, wherein each module includes an array of battery cells, and wherein each module is individually removable from the battery pack without requiring removal of the battery pack from the underbody;
an access cover mounted to the underbody and configured to selectively cover and uncover the battery pack;
a latch assembly selectively moveable to an engage position and a release position, wherein the access cover is prevented from being opened in the engage position, and wherein the access cover is able to be opened in the release position; and
a disconnect switch configured to selectively deenergize the battery pack, wherein the latch assembly is only in the release position when the disconnect switch deenergizes the battery pack;
a fluid source,
wherein the access cover includes a plurality of sets of inlets and outlets configured to direct fluid from the fluid source relative to the modules, and
wherein each module includes an inlet and an outlet configured to fluidly couple to one of the sets of inlets and outlets of the access cover.

6. The electrified vehicle as recited in claim 5, wherein, when the disconnect switch deenergizes the battery pack, fluid stops flowing from the fluid source.

7. The electrified vehicle as recited in claim 5, wherein the inlets and outlets of the access cover include male connections, and wherein the inlets and outlets of the modules include female connections.

8. The electrified vehicle as recited in claim 5, wherein the inlets and outlets of the access cover each include a valve configured to close when fluid stops flowing from the fluid source.

9. The electrified vehicle as recited in claim 5, wherein the inlets and outlets of each module are configured to seal closed when the corresponding set of inlets and outlets of the access cover are not interfaced with the inlets and outlets of the module.

10. The electrified vehicle as recited in claim 9, wherein the inlets and outlets of each module include valves configured to close when the access cover is opened.

11. An electrified vehicle, comprising:
an underbody; and
a battery pack mounted to the underbody, wherein the battery pack includes a plurality of modules, wherein each module includes an array of battery cells, and wherein each module is individually removable from the battery pack without requiring removal of the battery pack from the underbody,
wherein each module includes an electrical terminal,
wherein each module is electrically connectable to another module via an electrical connector connected to the electrical terminal,
wherein the electrical terminal is selectively covered and uncovered by a cap, and
wherein the cap is configured such that when the electrical connector is decoupled from the electrical terminal, the cap covers the electrical terminal.

12. The electrified vehicle as recited in claim 11, wherein the cap includes a moveable panel biased to a closed position by a spring.

* * * * *